Figure 1:
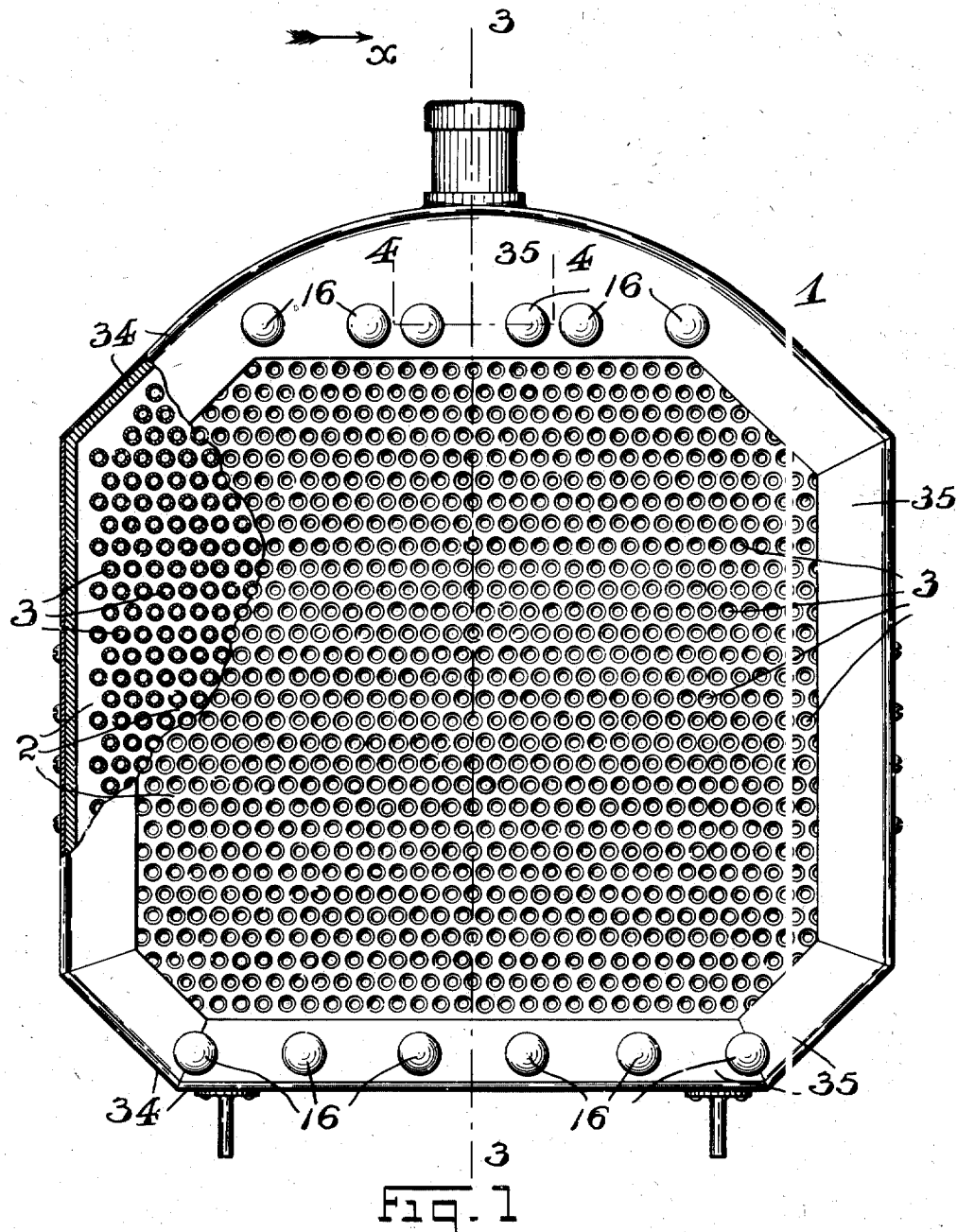

F. A. FELDKAMP.
RADIATOR AND RADIATOR SECTIONS THEREFOR.
APPLICATION FILED MAR. 16, 1911.

1,008,592.

Patented Nov. 14, 1911.
4 SHEETS—SHEET 1.

WITNESSES:
Frdk. K. W. Fraentzel
Harry E. Pfeiffer

INVENTOR:
Frederick A. Feldkamp,
BY Fraentzel and Richards,
ATTORNEYS

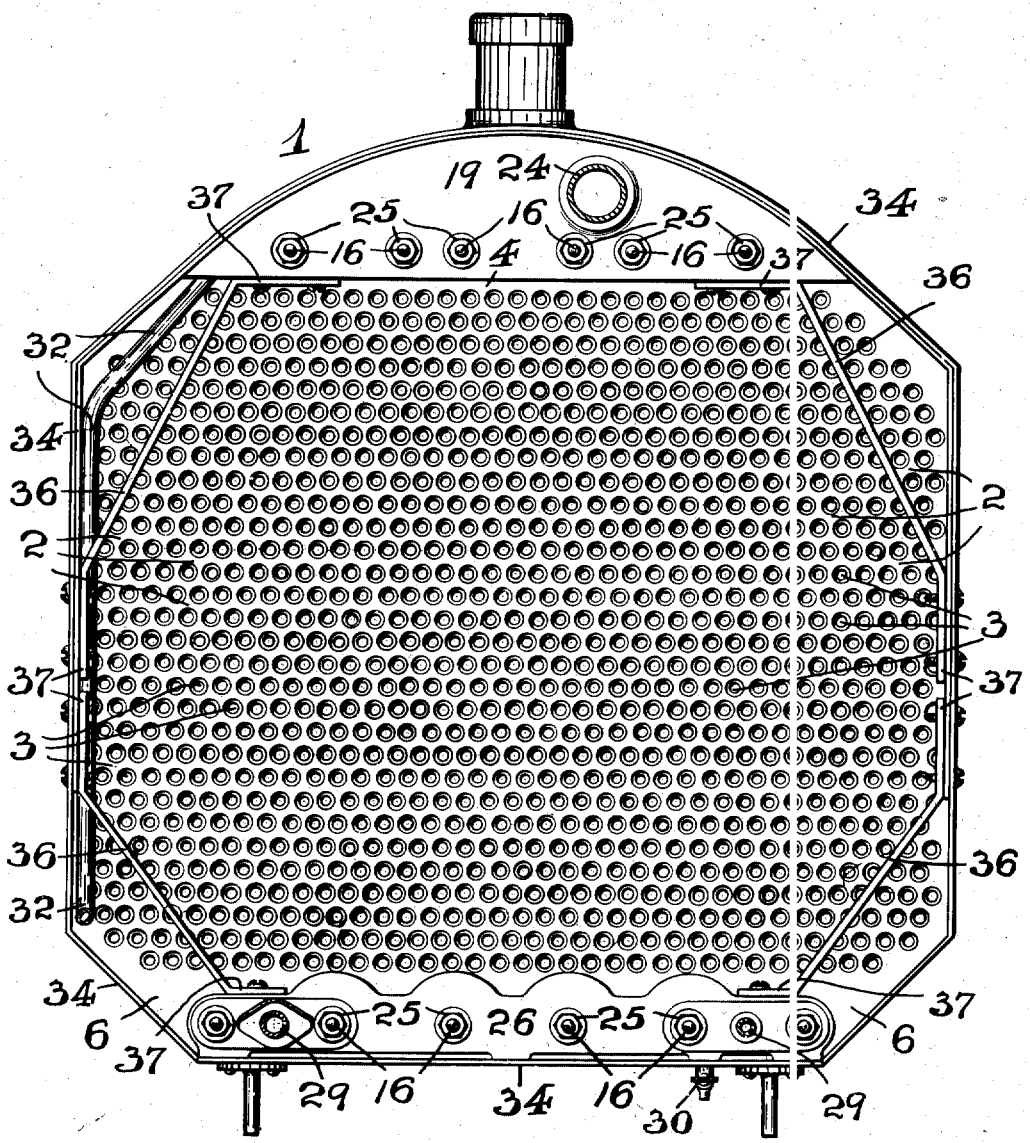

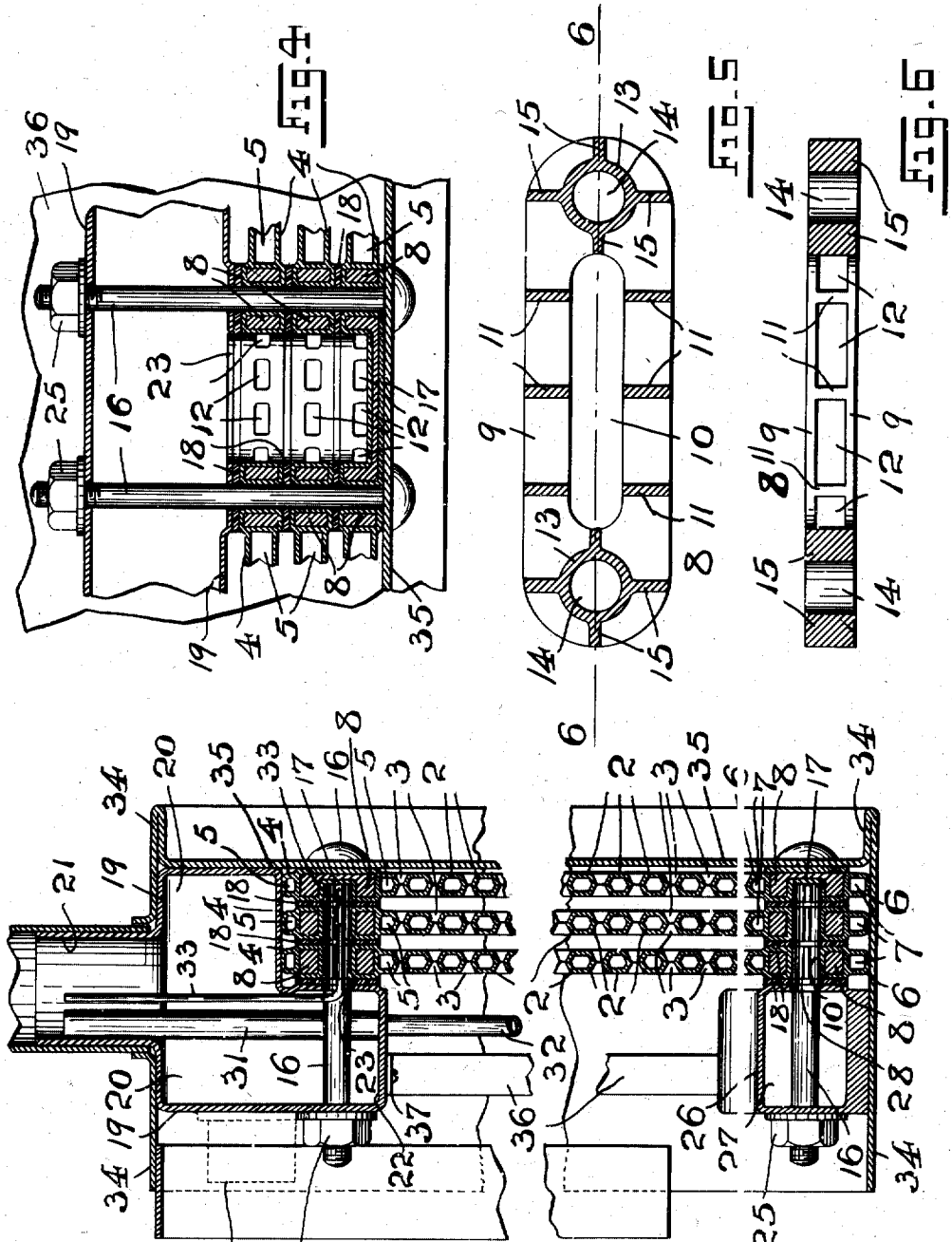

F. A. FELDKAMP.
RADIATOR AND RADIATOR SECTIONS THEREFOR.
APPLICATION FILED MAR. 16, 1911.

1,008,592.

Patented Nov. 14, 1911.

WITNESSES:

INVENTOR:
Frederick A. Feldkamp,
BY Fraentzel and Richards,
ATTORNEYS

UNITED STATES PATENT OFFICE.

FREDERICK A. FELDKAMP, OF VAILSBURG, NEW JERSEY, ASSIGNOR TO ELECTROLYTIC PRODUCTS CO., A CORPORATION OF NEW JERSEY.

RADIATOR AND RADIATOR-SECTIONS THEREFOR.

1,008,592.   Specification of Letters Patent.   Patented Nov. 14, 1911.

Application filed March 16, 1911. Serial No. 614,895.

*To all whom it may concern:*

Be it known that I, FREDERICK A. FELDKAMP, a citizen of the United States, residing at Vailsburg, in the county of Essex and State of New Jersey, have invented certain new and useful Improvements in Radiators and Radiator-Sections Therefor; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in radiators which are particularly adapted for use upon automobiles and similar vehicles, but which may be employed also with other classes of machinery or apparatus, where it is desirable to cool liquids or fluids by providing a means for increased radiation of heat.

The present invention has for its principal object to provide a novel and simple construction of radiator comprising a plurality of radiator-sections, each of which is in the form of an electrolytically deposited structure, made in one integral piece, and each radiator-section consisting of a multiplicity of hollow or tubular elements, interspersed with a multiplicity of holes or openings through which is permitted a free circulation of air, and means for operatively interconnecting the said plurality of radiator-sections together, so as to provide the same with common inlets and outlets, all in such a manner, as to avoid the use of solder, and whereby a mechanically connected solderless radiator is the result, thus reducing the danger and tendency of accidental leakage to a minimum.

A further object of the invention is to provide a radiator comprising a plurality of radiator-sections, which are connected in such a manner, so that in case of accident or injury to any single radiator-section, the same may be easily removed from its relation with its fellow-sections, and quickly replaced by a perfect one-piece and electrolytically produced radiator-section.

Other objects of this invention not at this time more particularly enumerated will be clearly understood from the following detailed description of the same.

With the various objects of this invention in view, the said invention consists, primarily, in the novel construction and arrangement of radiator and of the novel radiator-sections therefor and of the general character hereinafter set forth; and, the invention consists, furthermore, in the novel arrangements and combinations of the various parts more particularly described in the following specification, and then finally embodied in the clauses of the claim which are appended to and which form an essential part of this specification.

The invention is clearly illustrated in the accompanying drawings in which:—

Figure 7:
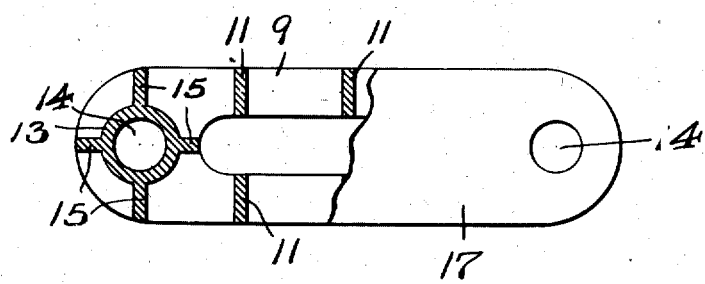
Figure 8:
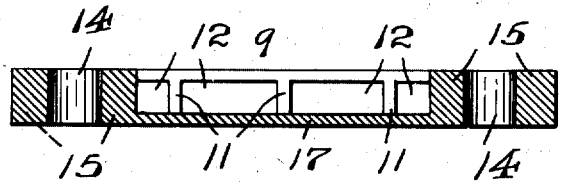
Figure 9:
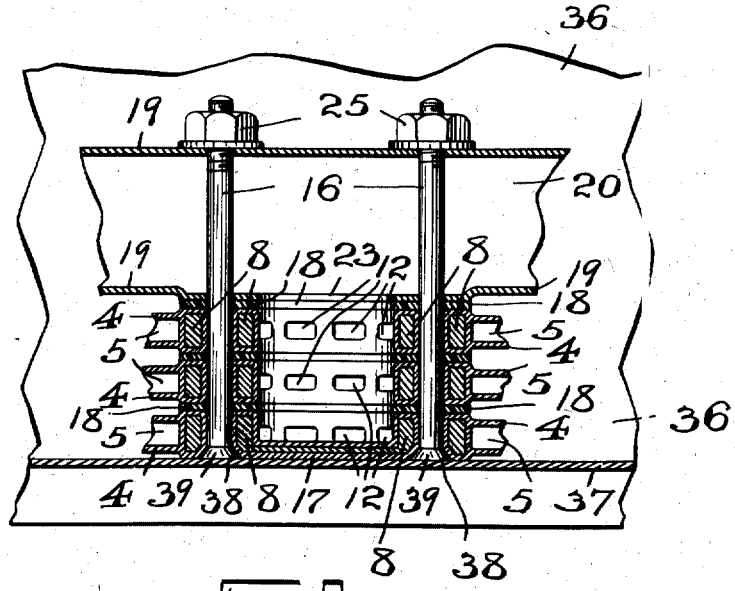

Figure 1 is a view of a radiator made according to and embodying the principles of the present invention, said view representing the radiator partly in front elevation and partly in transverse section; and Fig. 2 is a rear view of the radiator. Fig. 3 is a longitudinal vertical section of portions of the radiator, said section being taken on line 3—3 in said Fig. 1, looking in the direction of the arrow $x$, and the said view being made on an enlarged scale. Fig. 4 is a large detail horizontal section of portions of the radiator, said section being taken on line 4—4 in said Fig. 1. Fig. 5 is a longitudinal vertical section of a reinforcing connecting element with which each radiator-section is provided; and Fig. 6 is a horizontal section of the same, taken on line 6—6 in said Fig. 5. Fig. 7 is a part face view and part vertical section of a reinforcing connecting element designed to be used in connection with the outermost radiator-section; and Fig. 8 is a horizontal sectional representation of the same. Fig. 9 is a detail horizontal section, similar to that shown in Fig. 4, but illustrating a slightly modified construction of reinforcing connecting element in its connection and arrangement with the outermost of the connected radiator-sections of the radiator.

Similar characters of reference are employed in all of the above described views, to indicate corresponding parts.

Referring now to the said drawings, the reference-character 1 indicates a complete radiator made according to and embodying the principles of the present invention. The said radiator comprises a plurality of radiator-sections, all the parts of which, except certain reinforcing connecting elements to be subsequently described, being made in one integral piece formed by electrolytic deposition. Each of the said radiator-sections, therefore, comprises a hollow honey-comb body or shell formed with the interconnected tubular portions 2 interspersed with transverse holes or perforations 3 which provide suitable air-passages. The said radiator-sections may be made of any desired peripheral shape or configuration. Each radiator-section is also provided at its upper portion with an integrally formed shell 4 providing a chamber 5 in communication with said interconnected tubular portions 2; and, in like manner, each radiator-section is provided in its lower portion with an integrally formed shell 6 providing a chamber 7 also in communication with said interconnected tubular-portions 2. The reference-character 8 indicates suitable reinforcing connecting elements around which the walls of the said shells 4 and 6 of the several radiator-sections are formed during the process of their electrolytic construction, so that said reinforcing connecting elements 8 are incorporated, in proper locations within the body of each radiator-section, thus serving to reinforce and strengthen the radiator-sections at such points, and also performing other functions, such as will presently appear. Each reinforcing connecting element 8 comprises a pair of parallel side-walls 9 of suitable shape or design, the same being provided with elongated openings or passages 10, and extending between said parallel side-walls 9 are a plurality of suitably disposed transverse struts or webs 11 interconnecting said walls 9 and forming intervening vertical ducts or passages 12. Arranged adjacent to the ends of said side-walls 9 are integrally formed tubular members 13 which extend from wall to wall and are provided with bolt-receiving holes or passages 14. Radiating struts or webs 15 extend from said tubular members 13, said struts or webs being integrally connected with the said walls 9 so as to provide strength to the structure. As herein-above mentioned, the said reinforcing connecting elements 8 are incorporated, in proper locations, within the shells of said radiator-sections, the walls of which are electrolytically deposited about the said elements, so as to make the same, practically, an integral part of the said radiator-sections, as will be clearly evident. When thus incorporated within said radiator-sections, the passages provided by the said openings 10 in said side-walls 9 and the ducts 12 of said elements 8 are in communication with the interior of the chambers 5 and 7 of said radiator-sections, as the case may be, and thereby provide the respective inlets and outlets of the radiator-sections; but, as will be clearly seen from an inspection of the drawings, the said tubular members 13, shutting off communication with the respective passages formed in said elements 8, will provide a transverse passage or hole 14 to which fluid or liquid has no access, and through which may be passed suitable bolts 16 for connecting together the several radiator-sections with other parts of the complete radiator-section, to be subsequently more fully described. Since the said reinforcing connecting elements 8 provide fluid-conveying passages which are adapted to be connected with each other and which are in communication with the interior of the respective radiator-sections with which they are connected, it will be apparent that it is necessary to close such fluid-conveying passages against the escape of the fluid from the outermost radiator-section. To this end, the said reinforcing connecting elements 8 which are incorporated in an outside radiator-section are provided on one side with a solid side-wall 17 which closes the various passages connected therewith from communication with the exterior of the radiator, as will be clearly evident, but in all other respects, said elements are similar in construction to the other elements herein-above described. It will, of course, be understood, that the bolt-passages or holes 14 are, however, uninterrupted, when the several radiator-sections are arranged side by side in the manner illustrated in the drawings. The several radiator-sections, as thus constructed, are assembled together so that their respective reinforcing connecting elements 8 will register one with another so as to bring their respective fluid-conveying passages and bolt-passages or holes will be in alinement, substantially as illustrated. Suitable gaskets 18 are provided which are inserted between said registering elements 8 and which assure fluid-tight connections between the several fluid-conveying passages, in the manner shown in Figs. 3, 4 and 9.

The reference-character 19 indicates a shell or body, which is provided with a radiator inlet-collecting chamber 20, the same being cast in one piece. Connected with the upper portion of the said shell or body 19 is a tubular portion 21 which forms a suitable filling-cap by means of which fluid may be introduced into the radiator-system. The said shell or body 19 is further provided with a downwardly extending portion 22, the front wall of which is provided with openings or holes 23 adapted to be brought in registration with the fluid-passages of the elements 8 of the said registering radiator-sections, so as to afford a communication between said radiator inlet-collecting member 20 and the respective radiator-sections. Said shell or body 19 is further provided with neck-piece 24 which forms the inlet to the radiator.

When the several radiator-sections and the shell or body 19 are properly assembled, the bolts 16 are passed through the alined bolt-passages or holes 14 of the registered reinforcing connecting elements, said bolts being passed through the said holes, as shown, and their ends passing through the shell or body 19, the walls of which are provided with suitable holes for that purpose; and, the ends of the bolts, projecting beyond the rear of the said shell or body 19, are ready for the reception of the nuts and washers 25, whereby the several parts are tightly and operatively joined together.

It will be apparent, that the several struts or webs of each reinforcing connecting element take up and carry the strains of the binding bolt, and prevent the comparatively thin walls of the radiator-sections from being broken, crushed or strained.

The reference-character 26 indicates a shell or body providing a radiator outlet-collecting chamber 27, the same being cast in one piece. The front wall of said shell or body 26 is provided with openings or holes 28 which are adapted to be brought into registration with the fluid-passages of the elements 8 connected with the lower portions of the said assembled radiator-sections, so as to afford a communication between said radiator outlet-collecting chamber 27 and the several radiator-sections. Said shell or body 26 is further provided with fluid outlet-members 29, suitably connected therewith; and, the said shell or body 26 is also provided in its bottom wall with a pet-cock or valve 30 in communication with the said radiator outlet-chamber 27, by means of which the radiator can be emptied of the fluid circulating therein. When the several radiator-sections and said shell or body 26 are properly arranged in their assembled relations, the bolts 16 are passed through the alined bolt-passages or holes 14 of the registered reinforcing connecting elements, the ends of said bolts extend beyond the said shell or body 26, the walls of which are provided with suitable holes for that purpose, ready for the reception of the nuts and washers 25, by means of which the several parts are tightly and operatively joined together.

Referring again to said shell or body 19, it will be seen that the same is provided with an integrally formed tubular member 31 which extends upwardly through its interior and projects into said filling-cup 21, said tubular member 31 providing a suitable fluid-overflow. The lower end of the passage of said tubular member 31 is connected with a suitable duct or pipe 32, which extends downwardly into the rear of said radiator-sections, and thereby serves to discharge the overflow fluid in a convenient place. Arranged within said shell or body 19 is a tubular element 33 of small diameter, the upper end of which is carried above the normal level of the water within the radiator inlet-chamber 20, the lower or opposite end of said tubular element 33 being carried into the extreme outer end of a set of the said interconnected fluid-passages formed by said reinforcing connecting elements 8. The purpose of this tubular element 33 is to provide a vent for any air that may collect in the upper portion of the radiator-sections, and which may, when the automobile or other vehicle leaves the horizontal plane, as in ascending or descending a grade or hill, form an air-lock against the proper circulation of fluid in said radiator-sections, the air in that case escaping through the tubular element 33, breaking any air-lock which might otherwise thus be formed.

The radiator 1, as thus formed and constructed, may be provided with a suitable surrounding casing 34 which is formed with suitable marginal flanges 35 overlapping the front end of the radiator. Said flanges 35 are provided with suitable holes for the passage of the bolts 16. Said casing 34 may be further provided with bracket-members 36, the free ends 37 of which are adapted to be secured to suitable portions of the respective shells or bodies 19 and 26. The heads of the bolts 16 are exposed on the outer side of said casing-flange 35, in the construction above described, but it may be desirable from the standpoint of appearance, to eliminate the exposed bolt-heads. To this end, I have illustrated a slightly modified construction of reinforcing connecting element which is shown in Fig. 9 of the accompanying drawings. In this construction the bolt-passages or holes are provided with a counter bore, as 38, the bolts 16 being made with correspondingly formed counter-sinking heads 39 which are received by the said counter-bores 38 and are flush with the outer surface of the radiator-section, thereby permitting the said flanges 35 of the casing 34 to cover the same. It will of course be understood that the said counter-bores 38 are only provided in the reinforcing connecting elements used in the outermost radiator-section. It will also be understood, that the construction of the radiator-sections and other parts of the radiator is the same as herein-before described.

It will be clearly evident from the above description, that I provide in the present invention a radiator, the various parts of which are assembled and secured together mechanically and without the use of solder. It will be also apparent, that by removing the bolts 10, the radiator-sections can be easily and quickly separated, and a damaged or injured radiator-section replaced by a perfect section which, as will be clearly obvious, is a great and important advantage over the old styles of radiators as heretofore provided.

I claim:—

1. In a radiator, a plurality of radiator-sections, reinforcing connecting elements incorporated within each radiator-section, said reinforcing connecting elements being provided with fluid-passages adapted to be registered in communication when said radiator-sections are assembled together, each reinforcing connecting element being also provided with vertical ducts leading from said fluid-passages and communicating with the interior of said radiator-sections, tubular-members formed in each reinforcing connecting element to provide bolt holes, and strengthening struts or webs between the walls of each reinforcing connecting element, substantially as and for the purposes set forth.

2. In a radiator, a plurality of radiator-sections, reinforcing connecting elements incorporated within each radiator-section, said reinforcing connecting elements being provided with fluid-passages adapted to be registered in communication when said radiator-sections are assembled together, each reinforcing connecting element being also provided with vertical ducts leading from said fluid-passages and communicating with the interior of said radiator-sections, tubular members formed in each reinforcing connecting element to provide bolt holes, strengthening struts or webs between the walls of each reinforcing connecting element, a shell or body providing a fluid inlet-collecting chamber, a second shell or body providing a fluid outlet-collecting chamber, and bolts for securing together in operative relation the said radiator-sections and said respective shells or bodies, substantially as and for the purposes set forth.

3. In a radiator, a plurality of radiator-sections comprising one-piece hollow honeycomb bodies, reinforcing connecting elements incorporated in each radiator-section, the same comprising parallel side-walls provided with openings adapted to be registered in communication to form a common fluid-passage when said radiator-sections are assembled, strengthening struts or webs extending between the parallel side-walls of each reinforcing element and providing vertical ducts leading from said common fluid passage and communicating with the interior of their respective radiator-sections, tubular members formed between the side-walls of each reinforcing connecting element to provide independent transverse bolt-holes adapted to be registered in communication when said radiator-sections are assembled together, and gaskets adapted to be inserted between said registered reinforcing connecting elements, substantially as and for the purposes set forth.

4. In a radiator, a plurality of radiator-sections comprising one-piece hollow honeycomb bodies, reinforcing connecting elements incorporated in each radiator-section, the same comprising parallel side-walls provided with openings adapted to be registered in communication to form a common fluid-passage when said radiator-sections are assembled, strengthening struts or webs extending between the parallel side-walls of each reinforcing element and providing vertical ducts leading from said common fluid passage and communicating with the interior of their respective radiator-sections, tubular members formed between the side-walls of each reinforcing connecting element to provide independent transverse bolt-holes adapted to be registered in communication when said radiator-sections are assembled together, and gaskets adapted to be inserted between said registered reinforcing connecting elements, a shell or body having openings in communication with certain of said common fluid-passages formed by said reinforcing connecting elements, said shell or body providing a fluid inlet-collecting chamber, a second shell or body having openings in communication with certain of said common fluid-passages formed by said reinforcing connecting elements, said shell or body providing a fluid outlet-collecting chamber, and bolts for securing together in operative relation said radiator-sections and said respective shells or bodies, substantially as and for the purposes set forth.

5. In a radiator, a plurality of radiator-sections comprising one-piece hollow honeycomb bodies, reinforcing connecting elements incorporated in each radiator-section, the same comprising parallel side-walls provided with openings adapted to be registered in communication to form a common fluid-passage when said radiator-sections are assembled together, strengthening struts or webs extending between the parallel side-walls of each reinforcing connecting element and providing vertical ducts leading from said common fluid-passage and communicating with the interior of their respective radiator-sections, the said reinforcing connecting elements incorporated in the outermost radiator-section having a solid outer wall adapted to close at one end said common fluid-passage, tubular members formed between the side-walls of each reinforcing connecting element to provide independent transverse bolt-holes adapted to be registered in communication when said radiator-sections are assembled together, and gaskets adapted to be inserted between said registered reinforcing connecting elements, substantially as and for the purposes set forth.

6. In a radiator, a plurality of radiator-sections comprising one-piece hollow honeycomb bodies, reinforcing connecting elements incorporated in each radiator-section, the same comprising parallel side-walls provided with openings adapted to be registered in communication to form a common fluid-passage when said radiator-sections are assembled together, strengthening struts or webs extending between the parallel side-walls of each reinforcing connecting element and providing vertical ducts leading from said common fluid-passage and communicating with the interior of their respective radiator-sections, the said reinforcing connecting elements incorporated in the outermost radiator-section having a solid outer wall adapted to close at one end said common fluid-passage, tubular members formed between the side-walls of each reinforcing connecting element to provide independent transverse bolt holes adapted to be registered in communication when said radiator-sections are assembled together, gaskets adapted to be inserted between said registered reinforcing connecting elements, a shell or body having openings in communication with certain of said common fluid-passages formed by said reinforcing connecting elements, said shell or body providing a fluid inlet-collecting chamber, a second shell or body having openings in communication with certain of said common fluid-passages formed by said reinforcing connecting elements, said shell or body providing a fluid outlet-collecting chamber, and bolts for securing together in an operative relation said radiator-sections and said respective shells or bodies, substantially as and for the purposes set forth.

7. In a radiator of the character herein described, a radiator-section comprising a one-piece hollow honey-comb body, reinforcing connecting elements incorporated in the upper and lower portions of said body, the same comprising parallel side-walls provided with openings, a plurality of strengthening struts or webs extending between said parallel side-walls and forming vertical ducts in communication with the interior of said body, and tubular members extending between the ends of said side-walls, said members providing independent transverse bolt-holes, substantially as and for the purposes set forth.

8. In a radiator of the character herein described, an outer radiator-section comprising a one-piece hollow honey-comb body, reinforcing connecting elements incorporated in the upper and lower portions of said body, the same comprising parallel side-walls, the outer of said parallel side-walls being solid, and the inner of said parallel side-walls having an opening, a plurality of strengthening struts or webs extending between said parallel side-walls and forming vertical ducts in communication with the interior of said body, and tubular members extending between the ends of said side-walls, said members providing independent transverse bolt-holes, substantially as and for the purposes set forth.

9. A radiator comprising a plurality of radiator-sections, reinforcing connecting elements incorporated in the upper and lower portions of said radiator-sections, the same having fluid passages interconnecting so as to form common fluid inlet and outlet passages respectively in the upper and lower portions of said radiator-sections, tubular members connected with said reinforcing connecting elements providing independent transverse bolt-holes, a shell or body providing a fluid-inlet chamber, said shell or body having openings adapted to be registered with the fluid inlet-passages of said radiator-sections; and bolt holes also in said shell or body adapted to be registered with the bolt holes of said reinforcing connecting elements, a tubular portion connected with said shell or body providing a filling cup, a neck-piece connected with said shell or body providing a fluid-inlet, a tubular member rising vertically within said shell or body and open at the bottom, the same providing an overflow, a conveying pipe connected with the lower end of said tubular member, a second shell or body providing a fluid-outlet chamber, said shell or body having openings adapted to be registered with the fluid outlet passages of said radiator-sections and bolt-holes also in said last-mentioned shell or body adapted to be registered with said bolt holes of said reinforcing connecting elements, and fluid-outlet elements connected with said shell or body, substantially as and for the purposes set forth.

10. In a radiator, a plurality of radiator-sections having common fluid inlet and outlet passages respectively in their upper and lower portions, a shell or body providing a fluid inlet-collecting chamber having openings adapted to register with said common fluid inlet-passages of the radiator-sections, a second shell or body providing a fluid outlet collecting-chamber having openings adapted to register with the common fluid outlet-passages of said radiator sections, said radiator-sections being provided with independent transverse bolt holes and bolts passing through the same and said respective shells or bodies to assemble and secure the several parts of said radiator together, substantially as and for the purposes set forth.

11. In a radiator, of the character herein described, a plurality of radiator-sections having common or interconnected fluid passages, a shell or body providing a fluid inlet-collecting chamber in communication with the fluid passages of said radiator-sections, and a tubular element arranged within said fluid-inlet chamber, the upper end of which is adapted to project above the normal water level, and the lower end of said tubular element being adapted to project within one of said common or interconnected fluid-passages, said tubular-element projecting an air-vent with the interior of said radiator-sections, substantially as and for the purposes set forth.

12. In a radiator-section of the character specified, a reinforcing connecting element for radiator-sections comprising a pair of parallel walls having openings therein, tubular members extending between the ends of said walls and providing independent transverse bolt holes, and a plurality of suitably disposed strengthening struts or webs extending between said parallel walls, substantially as and for the purposes set forth.

13. In a radiator-section of the character specified, a reinforcing connecting element for radiator-sections comprising a pair of parallel walls one of which is provided with an opening, tubular members extending between the ends of said walls and providing independent transverse bolt holes, and a plurality of suitably disposed strengthening struts or webs extending between said parallel walls, substantially as and for the purposes set forth.

14. In a radiator-section of the character specified, a reinforcing connecting element for radiator-sections comprising a pair of parallel walls one of which is provided with an opening, tubular members extending between the ends of said walls and providing independent transverse bolt-holes, said bolt holes being provided at one end with counter-bores adapted to receive the counter sinking head of a bolt, and a plurality of suitably disposed strengthening struts or webs extending between said parallel walls, substantially as and for the purposes set forth.

In testimony, that I claim the invention set forth above I have hereunto set my hand this 10th day of March, 1911.

FREDERICK A. FELDKAMP.

Witnesses:
FREDK. C. FRAENTZEL,
FREDK. H. W. FRAENTZEL.